United States Patent Office 3,409,087
Patented Nov. 5, 1968

3,409,087
DEPTH-CONTROL DEVICE FOR SOIL-WORKING IMPLEMENTS
Walter Schneider, Schonebeck (Elbe), Germany, assignor to VEB Traktorenwerk Schonebeck, Schonebeck (Elbe), Germany
Continuation-in-part of application Ser. No. 475,507, July 28, 1965. This application Apr. 5, 1966, Ser. No. 540,347
5 Claims. (Cl. 172—7)

ABSTRACT OF THE DISCLOSURE

A depth-control device for a tractor-drawn plow or other soil-working implements in which a rod 17 is coupled with the plow and provides a setback of soil resistance to an actuating member 10 connected between a control cylinder 9 and the valve 16 operating the power cylinder 11 which raises and lowers the plow; the operator shifts the raise and lower lever 1 whose link member 4 cooperates with a cam 3 responsive to plow movement to operate a control valve 15 connected with the control cylinder 9 while a double arm lever arrangement 5–8 connects member 4 with member 10.

---

Figure 1:
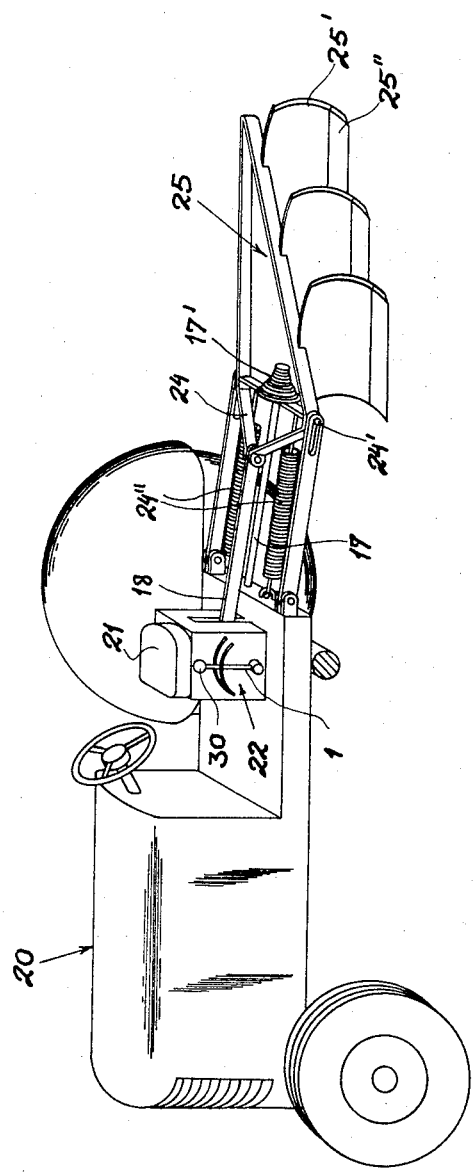

This application is a continuation-in-part of my copending application Ser. No. 475,507, filed July 28, 1965, and entitled "Automatic Depth-Control Device for Soil-Working Implements."

My present invention relates to soil-working implements such as plows or the like adapted to be inserted into the soil and to be raised and lowered by hydraulic controls and, more particularly, to improvements in control devices for regulating the position of such implements, namely the depth of attack, in spite of changing soil conditions.

Tractor-towed soil-working implements e.g. plows, cultivators, digger-type harvesters, channeling apparatus and similar implements have hitherto been mounted upon or coupled with the prime mover (e.g. an agricultural, industrial or construction tractor) provided with hydraulic or pneumatic devices for controlling the depth of the implement. Such devices include manually shiftable levers having a plurality of positions corresponding to different depths at which the implement is settable. Automatic depth regulation can be provided to compensate for the tendency of the plow or other implement to drive deeper into the earth when the soil resistance to forward motion of the plow decreases and, conversely, to raise the implement when the soil resistance increases. To maintain a relatively constant depth of operation, servomechanisms including ground-engaging sensors and the like have been provided to compensate for variations in the ground contour and to maintain the desired normal operating conditions set by the manually actuatable element. A prime difficulty of such prior-art systems has been the inability of the control system to compensate for changes in the soil resistance to forward movement of the implement and thus to prevent the strain upon the tractor-drive mechanism, the plow and its linkage with the tractor.

In my copending application mentioned above, I describe a system whereby some of the disadvantages of prior-art structures can be avoided by means of an automatic depth-control device and it is the principal object of the present invention to extend the principles set forth in this earlier application to overcome some further disadvantages, as will be described in greater detail below. The basic components of the automatic depth-control device of this earlier-filed application and, therefore, important components of the present system, are the actuating element shiftable by the operator of the towing vehicle (e.g. tractor), a control member co-operating with this actuating element connected with a fluid-control valve, fluid-responsive means controlled by the valve for raising and lowering the implement (e.g. a plow towed by the tractor), and means for shifting the control element independently of its movement by the manually actuatable element in response to movement of the implement under the control of the fluid-responsive means to feed back an indication of the movement of the implement to the valve means. In accordance with an important feature of the invention set forth in the above-mentioned earlier application, means is provided for preventing the shifting of the valve member during relative movement of the control member and the actuating element within the range defined by the lost motion. Thus, this adjustable lost-motion stroke permitted the implement to rise and lower in accordance with soil conditions within a limited range without calling for a correction on the part of the control-valve and fluid-responsive means of the servosystem. As indicated, the control element was flexibly linked with the valve by means following the motion of the implement so that, upon termination of the lost-motion stroke and immobilization of the control member (e.g. upon its engagement with the actuating element in one of the extreme positions thereof), further movement of the implement upwardly or downwardly beyond the level represented by this extreme position will result in an actuating of the link means independently of further movement of the control member.

I have now found that conventional servosystems for regulating the working depth of an implement and for maintaining this depth substantially constant and independent of changing soil resistance and sporadic movements of the tractor have generally required double-action working cylinders for the positive raising and lowering of the implement. Agricultural tractors and most other towing vehicles with which such implements are used are normally not provided with double-acting cylinders of this character and rely upon a single-acting cylinder for raising the implement which is thereafter lowered by its own weight against the resisting force of the latter cylinder. Thus, the requirement of earlier systems for double-acting cylinders has rendered the servo-control devices unsuitable and necessitated replacing of the already installed hydraulic devices.

The use of single-acting cylinders for controlling the depth of the soil-working implements has the disadvantage that, upon encountering especially difficult soil conditions or operating situations, a control impulse (for holding the implement at a relatively deep position or driving it to this position in the event it has risen) only acts after a time and maintains the valve in its position corresponding to "lower"; thus the valve remains open and the implement tends to lower under its weight. The traction force is then brought up to its maximum under the circumstances and, upon encountering more suitable soil conditions, the implement rapidly drives deeply into the ground. This undesirable result can be countered only slowly by manipulation of the actuating lever.

It is a further object of the present invention to provide an automatic depth-control system for agricultural implements and like towed devices in which the aforementioned disadvantages, deriving from the sudden fluctuations in the degree of the penetration of the implement and its effects upon the tractor and the implement, can be avoided.

These objects and others which will become apparent hereinafter are attained by my invention with a device for the automatic control of the depth of the implement which, in the manner set forth in my earlier-filed pending application mentioned above, comprises an actuating element acting upon a control member which is coupled with valve means for controlling the hydraulic power cylinder. I have found that the aforedescribed results can be obtained when the hydraulic-power cylinder is operatively connected to the implement via an implement-controlling lever fulcrumed on the prime mover, this power cylinder being of the single-acting type and co-operating with a first valve which controls the flow of fluid to and from this power cylinder to regulate upward and downward movement of the implement, e.g. against or with the force of gravity acting thereon. In accordance with the principles of the present invention, a position-responsive means is provided to co-operate with a depth-setting or actuating element and includes a second valve coupled with the actuating element via a control member adapted to follow the movement of the implement and thus constituting a servocontrol; the control cylinder of the second valve is connected, in turn, to a control member for the first valve, while traction-responsive means, e.g. a tensionable rod whose tension force is a function of the drag of the plow, is connected to this last-mentioned control member for shifting the valve of the power cylinder.

An important feature of this invention resides in the provision of a link means between the control members for inversely connecting them so as to shift the control cylinder valve into a "neutral" position to the extent to which the power-cylinder valve is already in its "lower" position as a consequence of the action of the traction-responsive means. Furthermore, the link means is advantageously a relatively simple double-arm lever fulcrumed on the prime mover and designed to move the control-cylinder valve into the "neutral" position to the extent to which it may have been in the "lower" position when the power-cylinder valve is energized in the "lower" sense. The control-cylinder valve thus remains in the neutral position until the power-cylinder valve is restored to its "neutral" position upon relaxation of the traction-responsive means.

A further feature of the present invention resides in the provision of lost-motion means between the members whereby movement of the control-cylinder (i.e. second) valve is free within an adjustable limited range when the power-cylinder (i.e. first) valve is in its "neutral" or "raise" position.

It will be evident that such a system permits a single-action power cylinder to be employed in a depth-controlling system for a plow or the like subjected to sudden depth fluctuations without multiplication of such movements because of tendencies toward overcompensation characterizing earlier systems.

Figure 2:
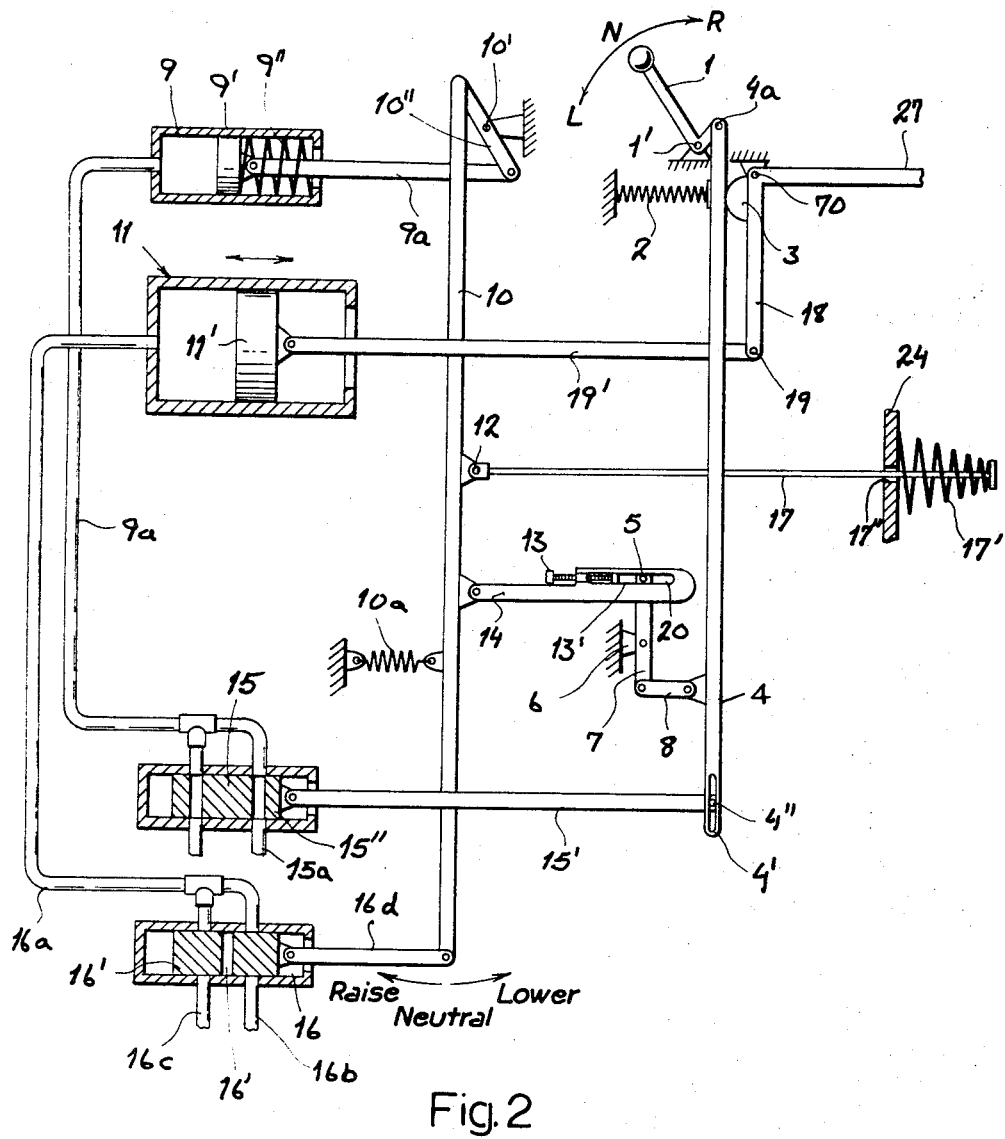

The above and other objects, features and advantages of the present invention will become more readily apparent from the following description in which:

FIG. 1 is a perspective view of a tractor provided with a control system, in accordance with this invention; and FIG. 2 is a diagrammatic elevational view of the control mechanism.

The control system of the present invention can be used in connection with a conventional agricultural tractor 20, one of whose rear or driving wheels has been shown removed in FIG. 1 to reveal the actuating means 22 of the control system disposed generally in the region of the seat 21 for the operator. The actuating means 22 comprises a rod 1 whose knob 30 is engageable by an operator in his normal driving position upon seat 21. The usual three-point linkage, generally designated 24, connects a plow 25 to the tractor at its tow bar 24'. The plow is urged toward the tractor by spring assemblies 24''. The plow is of any conventional type and can comprise the customary support frame carrying the mold boards 25' and the shares 25'' of a plurality of plows. A hydraulic system is provided for raising and lowering the plow by means of a lever 18 pivoted at 70 to the tractor body.

Referring now to FIG. 2, it will be seen that the actuating lever 1, which is pivoted at 1' to the vehicle body, is articulated to a control member 4 whose slotted lower extremity 4' receives a pin 4'' of a connecting rod 15' of the control valve 15. The rod 15' is pivotally connected with the valve member 15'' of this valve. The control member 4 is urged by a spring 2 against sectoral cam 3 carried by the arm 18 of a bell-crank lever whose other arm 27 carries the plow frame, as previously noted, the lever 18 being fulcrumed at 70 to the tractor body. Since the cam sector 3 is eccentric with respect to the fulcrum 70, the control member 4 follows the movement of the bell-crank lever 18 and thus the rising and lowering motion of the plow. The actuating element 1 can be displaced between a raise position R and a lower position L which can be defined by stops or abutments, as described in the copending application mentioned above.

To raise and lower the bell-crank lever 18, I provide a hydraulic working cylinder 11 whose piston 11' is coupled by a bar 19' to the arm 18 at a pivot 19. Thus, when the piston 11' of the single-acting cylinder 11 is displaced to the right (FIG. 2), the bell-crank lever 18 is swung in a counterclockwise sense to raise the plow; conversely, movement of the piston 11' to the left causes a clockwise rotation of the bell-crank lever and thus the lowering of the plow. Fluid flow to and from the cylinder 11 is controlled by a first control valve 16 whose valve member 16' is formed with a channel 16'' adapted to connect the hydraulic line 16a of a cylinder 11 to the pressure side 16c of a hydraulic system upon a movement of the valve member 16' to the left; movement of the valve member 16' to the right results in a connection between the reservoir or return side 16b of the hydraulic system to the fluid-transmission line 16a of cylinder 11. The valve member 16' is pivotally connected by a rod 16d to the "first" control member 10 designed to translate the movement of a servocontrol cylinder 9 into a corresponding movement of the valve member 16'. For this purpose, the auxiliary control member 10 is coupled to a rod 10'' which is pivotally mounted at 10' upon the vehicle body and is, in turn, swingable by the piston 9' of the control cylinder 9. The latter acts against the force of a spring 9'' to shift a connecting rod 9a articulated to the lever 10''. Furthermore, a spring 17' acts upon a slidable tension rod 17 of the traction-responsive means and which is received in a guide opening 17'' of the implement, to return the auxiliary control member 10 to its neutral position, as shown in FIG. 2, when the drag is minimal. The guide rod 17 is pivotally connected to control member 10 at 12 and this control member is drawn to the left against the force of spring 17' by a further spring 10a. A lost-motion linkage is formed by a bar 14 which is provided with a slot 13' in which the end 5 of a double-arm lever 7 is guided between an adjustable screw-type abutment 13 and the wall of slot 13' remote therefrom. The double-arm lever 7 is fulcrumed at 6 to the vehicle body and connected via the pivoted bar 8 with the main control member 4, previously described.

When the plowing of a furrow is to be commenced, the tractor and plow are set into forward motion at the plowing speed considered normal for the soil conditions encountered and the lever 1 is displaced into its "lower" position L by a counterclockwise movement of this lever about its fulcrum 1'. The degree of movement of the lever 1 will, of course, correspond to the desired plowing depth. The lever 1 swings the main control member 4 to the left at its upper end and, as the control member 4 is urged by spring 27 against the camming sector 3, the bottom end of the control lever with the slot 4' shifts the servo-control valve 15 to actuate the cylinder 9 which, in turn, operates the valve 16 via member 10.

As long as the second control member 4 is swung into its "lower" position, usually the case when the plow or other implement is not yet fully inserted in the ground, and the cam 3 of the implement-control lever 18 has not yet restored the control member 4 to its neutral position, the tension upon the traction rod 17 is not materially increased and the implement continues to lower under the direct control of the lever 1 by the servoaction of the valve 15, the follower action of the control cylinder 9, and the movement of the first control lever 10 is transmitted to the power-cylinder valve 16. In the fully lowered position, assuming no increase in tension on the rod 17, the movement of the first control member 10 into its "lower" position will cause an entrainment of the double-arm lever 7 of the link means between the control members 4 and 10 to return the lever 4 to its neutral position.

When, however, the implement-drawing force increases as a result of soil conditions tending to augment the drag on the implement, the rod 17 is stressed by the spring 17' and thus shifts the control member 10 into its neutral position so that, at this time, the control member 4 is freed to move within the range of lost motion defined by the slot 13', whereby the spring 2 swings the member 4 into its "lower" direction and this movement is transmitted via the servomechanism 9, 15 to the power-cylinder valve 16 and the implement is restored to its preset working depth; the latter is not exceeded because the cam 3 swings the lever 4 back into its neutral position at this point.

During the "raise" movement of the implement, the control member 10 is swung about the fulcrum 12 and entrains therewith the bar 14. This movement of the latter is not transferred to the control member 4 as a consequence of the lost motion of the slot 13' which can be adjusted by the set screw 13 so that the end 5 of the arm of the lever 7 assigned to the control member 10 is free to move within the slot 13' in the "raise" and "neutral" positions of the control member 10. Thus, if the control member 10 is already in its "lower" position, the "lower" position of the control member 4 is blocked, thereby preventing any overcorrection as a consequence of a lowering impulse coupled with a change in soil conditions. The lowering of the implement is, consequently, controlled by the traction applied by the prime mover to the implement so that a sudden increase in ground resistance will not yield a rapid penetration of the implement further into the ground.

The invention described and illustrated is believed to admit of many modifications within the ability of persons skilled in the art, all such modifications being considered within the spirit and scope of the appended claims.

I claim:

1. A depth-control system for a towed implement drawn by a prime mover, comprising:
    a hydraulic power cylinder operatively connected to said implement and energizable with an hydraulic fluid for controlling upward and downard movement of said implement;
    a first valve connected with said power cylinder for controlling the flow of fluid to and from said power cylinder;
    an actuating element mounted on said prime mover and shiftable between a "raise" position and a "lower" position to raise and lower said implement and adjust same to a desired operating depth;
    position-responsive means including a second valve and a control cylinder connected with said second valve for operating said first valve in response to said actuating element;
    traction-responsive means responsive to the traction force applied by said prime mover to said implement and operatively connected with said first valve for shifting same, said traction-responsive means including a first coupling member connecting said control cylinder with said first valve, and said position-responsive means including a second control member connecting said actuating element with said second valve;
    a tension element forming part of said traction-responsive means acting upon said first control member; and
    link means interconnecting said members for shifting said second valve to deactivate said control cylinder proportionately to the extent to which said first valve is shifted by said tension element in implement-lowering direction, said link means including a double-arm lever fulcrumed on said prime mover and having arms respectively cooperating with said members for shifting said second member from an implement-lowering position toward a neutral position thereof upon movement of said first member by said actuating element in an implement-lowering direction and for maintaining said second member in the latter position until the tension element returns said first member to a neutral position.

2. A depth-control system as defined in claim 1 wherein said first valve has a "raise" position, a "neutral" position and a "lower" position, said link means further comprising a lost-motion linkage between one of said arms and the respective member for permitting shifting of said second valve within at least a limited range in said "raise" position and said "lower" position of said first valve.

3. A depth-control system as defined in claim 2 further comprising means for adjusting said range.

4. A depth-control system as defined in claim 3 wherein said second control member is a rod articulated to said actuating element at one extremity and coupled with said second valve at its other extremity, said system further comprising an implement-controlling lever pivotally mounted upon said prime mover and having an arcuate cam engageable with said rod, said position-responsive means including spring means urging said rod against said cam, said power cylinder being connected with said implement-controlling lever for displacing same to regulate the elevation of said implement, said double-arm lever being pivotally connected with said rod at one arm, the end of the other arm of said double-arm lever forming part of said lost-motion linkage, said lost-motion linkage further comprising a slotted bar pivotally mounted upon said first member, said end being guided in the slot by said bar, said bar having at least one screw forming an adjustable abutment for said end, said traction-responsive means including a further rod pivotally connected to said first member and spring means between said further rod and said implement stressable upon an increase of the drag of said implement upon said prime mover.

5. A system as defined in claim 4 wherein said implement is a plow, said prime mover is a tractor, and said hydraulic power and control cylinders are single-acting hydraulic cylinders, said control cylinder being provided with spring means for urging said first member in one direction and is energizable through said second valve for counteracting said spring means.

References Cited

UNITED STATES PATENTS 3,096,830   7/1963   Criswell et al. _____ 172—9

FOREIGN PATENTS 1,298,818   6/1962   France.
952,170   3/1964   Great Britain.

ABRAHAM G. STONE, *Primary Examiner.*

J. R. OAKS, *Assistant Examiner.*